United States Patent [19]

Fowler

[11] Patent Number: 4,807,835
[45] Date of Patent: Feb. 28, 1989

[54] SPACECRAFT ATTITUDE STABILIZATION SYSTEM

[75] Inventor: Robert Z. Fowler, Ithaca, N.Y.

[73] Assignee: Ithaco, Inc., Ithaca, N.Y.

[21] Appl. No.: 37,293

[22] Filed: Apr. 10, 1987

[51] Int. Cl.[4] .............................................. B64G 1/32
[52] U.S. Cl. ................................................... 244/166
[58] Field of Search ............... 244/164, 165, 166, 171; 364/434, 453, 454, 443

[56] References Cited

U.S. PATENT DOCUMENTS

| | | | |
|---|---|---|---|
| 3,061,239 | 10/1962 | Rusk | 244/166 |
| 3,232,561 | 2/1966 | Adams | 244/166 |
| 3,367,605 | 2/1968 | Wanger | 244/166 |
| 3,429,524 | 2/1969 | Buckingham et al. | 244/166 |
| 3,489,372 | 1/1970 | Ellis et al. | 244/166 |
| 3,681,583 | 8/1972 | Kubo et al. | 244/166 |

*Primary Examiner*—Galen Barefoot
*Attorney, Agent, or Firm*—Richard G. Stephens

[57] ABSTRACT

The attitude of a spacecraft can be effectively controlled in three axes using the combination of a gravity gradient boom and three electromagnets. The electromagnets are controlled according to a control law that takes into consideration signals from a magnetometer and a signal indicating the orbital angular velocity of the spacecraft.

During the acquisition phase of the flight, the gravity gradient boom is not extended and electromagnets are operated according to a control law that only takes into account the output of the magnetometer. After the acquisition phase is complete, the gravity gradient boom is extended and the spacecraft enters the libration phase of the flight. In the libration phase of the flight, electromagnets are controlled according to a control law that takes into account both the output of the magnetometer and a signal which indicates the orbital angular velocity of the spacecraft.

9 Claims, 2 Drawing Sheets

SPACECRAFT ATTITUDE STABILIZATION SYSTEM

TECHNICAL FIELD

The present invention relates to spacecraft and more particularly to a novel system for controlling and orienting a spacecraft.

BACKGROUND AND PRIOR ART

The motion of a spacecraft can be divided into two types of motion. First, the center of mass of the spacecraft may be moving relative to the center of the Earth, and second the spacecraft may be moving about its own center of mass.

Control of the position and velocity of a spacecraft relative to the center of the Earth are the subject of celestial mechanics, or space navigation and the present invention does not deal with controlling this type of motion.

The orientation and motion of a spacecraft about its center of mass are referred to as the attitude and attitude motion of the spacecraft. In general the attitude and attitude motion of a spacecraft are specified by reference to three orthogonal coordinates called roll, pitch and yaw.

There are a variety of known techniques for controlling the roll, pitch and yaw of a spacecraft. The known techniques can be divided into "passive" stabilization techniques which require no power input and "active" stabilization techniques which require a power source.

The known techniques for passive stabilization include techniques such as "gravity gradient" stabilization, "spin" stabilization", "solar radiation" stabilization, "aerodynamic" stabilization and "permanent magnet" stabilization. The known techniques for active stabilization include "gas jet" stabilization, "electromagnet" stabilization, "reaction wheel" stabilization, and "ion thruster" stabilization. Each of the active techniques use or consume power during their operation.

A variety of known active and passive techniques for controlling the attitude of a spacecraft are explained in a book entitled *Spacecraft Attitude Determination and Control* Edited by James R. Wertz and published by D. Reidel Publishing Company, 1978, 1985.

Passive stabilization of a spacecraft using a gravity-gradient boom is attractive due to the simplicity of the apparatus used, however, spacecraft stabilized by a gravity-gradient boom often exhibits librational motion due to errors in the initial attitude acquisition process. Passive dampers such as spring dampers, hysteresis dampers, and eddy current dampers can be used to damp librational motion; however, such dampers have certain shortcomings.

Spring dampers are more effective in removing librations in the orbit plane than in removing librations perpendicular to the orbit plane. Eddy current dampers move a spacecraft into a nonzero bias attitude, resulting in limit cycle oscillations. Furthermore, eddy current dampers provide relatively weak damping and they have the disadvantage that the devices include mechanically moving parts.

For spacecraft which have relatively equal pitch and roll moment of inertia, a gravity gradient boom together with a momentum wheel to impart sufficient stability around the yaw axis have been used to obtain three axis control.

It is known that three orthogonal electromagnets controlled by the output of a magnetometer can be used in the acquisition phase of the stabilization process. In such system after the space craft is grossly stabilized using the orthogonal electromagnets, one or more reaction wheels or momentum wheels are normally used to control the pitch, roll and yaw to the desired degree of precision. Such systems in effect have two separate attitude control systems, one of which is used during the acquisition phase of the operation and one of which is used during the remaining part of the flight.

OBJECTS OF THE INVENTION

An object of the present invention is to provide an improved system for spacecraft attitude control.

Another object of the present invention is to provide a simple and inexpensive spacecraft stabilization system.

Yet another object of the present invention is to provide an improved system for yaw axis control in a spacecraft which is stabilized by a gravity gradient boom.

Still another object of the present invention is to provide an Earth referenced stabilization system for a space craft which has no moving parts operable during the libration phase of operation.

Yet another object of this invention is to provide an active magnetic libration damping system for a gravity gradient stabilized spacecraft that eliminates the need for a momentum wheel.

A still further object of this invention is to provide a simple attitude control system for a spacecraft that can be used during both the acquisition and libration phases of a flight.

The foregoing and other objects, features and advantages of the invention will be apparent from the following more particular description of preferred embodiments of the invention, as illustrated in the accompanying drawings.

SUMMARY OF THE INVENTION

The attitude of a spacecraft is controlled using the combination of a gravity gradient boom and three electromagnets. The electromagnets are controlled according to control laws or algorithms that take into consideration signals that indicate the rate of change of the Earth's magnetic field and the orbital angular velocity of the spacecraft.

During the acquisition phase of the flight, the gravity gradient boom is not extended and the electromagnets are operated according to control laws that only take into account the rate of change of the Earth's magnetic field. After the acquisition phase is complete, a gravity gradient boom is extended and the spacecraft enters the libration phase of the flight. In the libration phase of the flight, electromagnets are controlled according to control laws or algorithms that take into account both the rate of change of the Earth's magnetic field and the orbital angular velocity of the spacecraft.

The active damping system of the present invention is more effective and rapid than the existing passive damping methods. A combined magnetic and gravity gradient control system can provide three axis stabilization of satellites. Futhermore, magnetic torques can be used for attitude acquisition or reacquisition and satellite spin or despin. These functions can be made automatic and autonomous. Such a system includes the following functions:

(a) sensing the Earth magnetic field and field rates.

(b) controlled generation of magnetic torques.

(c) configuration of the spacecraft suitable for gravity gradient stabilization.

No inertial sensing or inertial control is needed. No optical attitude sensor is needed. Such systems could however be used as adjuncts, if desired, for specific requirements beyond the capabilities of the gravity gradient and magnetic control methods of the present invention.

The gravity gradient and magnetic control method and system of the present invention can provide the following functions:

(a) despin (or spin control) of a satellite.

(b) attitude acquisition or reacquisition.

(c) three axis stabilized attitude control.

The present invention operates:

(a) Without the need for inertial systems such as gyroscopes, momentum wheels etc.

(b) Without the need for optical attitude sensors such as

Earth sensors, star sensors, sun sensors, etc.

(c) Without the need for mechanical libration damping.

The present invention requires no moving parts other than what is necessary to extend the gravity boom at the end of the acquisition phase of the flight.

DETAILED DESCRIPTION

The specific embodiment of the invention described herein is for an Earth pointing spacecraft which has substantially equal pitch and roll axes. Naturally the invention could be applied to spacecraft with other parameters and the scope of the invention is as specified by the claims.

The inventions is applied to provide three axis control for the spacecraft. The spacecraft includes a gravity gradient boom; however, it does not include a momentum wheel.

The coordinate system used in the description of the invention is as follows: The x axis is aligned with the orbital velocity vector. The y axis is aligned with the negative orbital normal vector. The z axis is along the local vertical toward the center of the Earth. The deviation of the spacecraft body axis from the nominal orientation is expressed in terms of three angles designated as roll, yaw and pitch angles. In the equations, dots denote derivatives with respect to time.

The particular example of the invention described in detail herein is a spacecraft with the following parameter:

Roll moment of inertia—2157 kg-m$^2$
Pitch moment of inertia—2157 kg-m$^2$
Yaw moment of inertia—35.5 kg-m$^2$
Orbit attitude—843 km
Orbit inclination—115 degrees
Orbit Period—6107 seconds The equations of motion of the type of spacecraft controlled by the present invention are well known and are found among other places in a textbook entitled *Spacecraft Attitude Determination and Control* by James Wertz, published by R. Reidel Publishing Company 1985. This book is Volume 73 of the *Astrophysics and Space Science Library*. The equations for the particular type of spacecraft under discussion herein (and using the same coordinate systems as in this description) are found beginning on page 610 of this text book.

It is conventional that the flight of a spacecraft of the type described herein is divided into acquisition and libration phases. It is known that the libration motion in the libration phase of flight is a result of initial conditions that arise from the attitude acquisition process. It is well known that the maximum libration frequency is 1.732 times the orbit frequency and the pitch motion is uncoupled from the roll and yaw motion.

The present invention controls librational motion by utilizing three orthogonal electromagnets which are activated in accordance with a novel control law. Suitable electromagnets are commercially available under the trademark TORQRODS. TORQRODS are produced and marketed commercially by Ithaco Inc. of Ithaca, New York.

Figure 1:
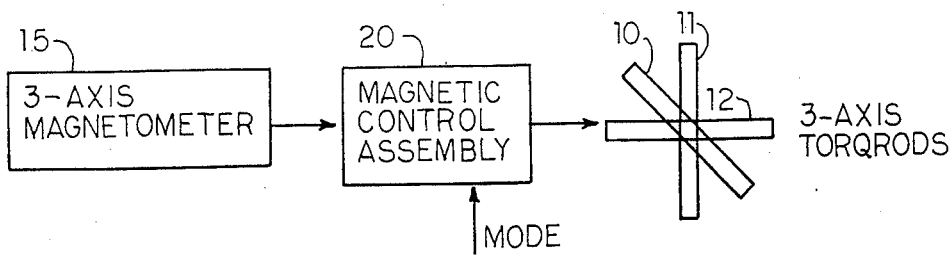
FIG. 1 is an overall block diagram of a control system that operates in accordance with the present invention.

FIG. 1 shows the overall control system of the present invention. The system includes three TORQRODS 10, 11, and 12 which are orthogonally positioned relative to each other. The TORQRODS are controlled by the output of a three axis magnetometer 15 through a control assembly 20. Unit 20 is provided with a mode signal 21 which indicates if the spacecraft is in acquisition mode or in libration mode and with a signal 22 which indicates the orbital rate.

In acquisition mode the system operates according to the prior art, that is, the system controls the spin and spin axis of the spacecraft so that the gravity gradient boom can be lowered. As is well known, at this point the spacecraft is subject to libration motion. In the prior art systems, after the gravity gradient boom is lowered a momentum wheel (or other passive device) is used to control libration motion. The present invention eliminates the need for the momentum wheel or other passive device. With the present invention, at the end of the acquisition phase of the flight, signal 21 is changed to indicate that the spacecraft is in the libration phase and the control assembly 20 activates the TORQRODS 10, 11, and 12 in a manner which will be described to stop the libration motion.

Figure 2:
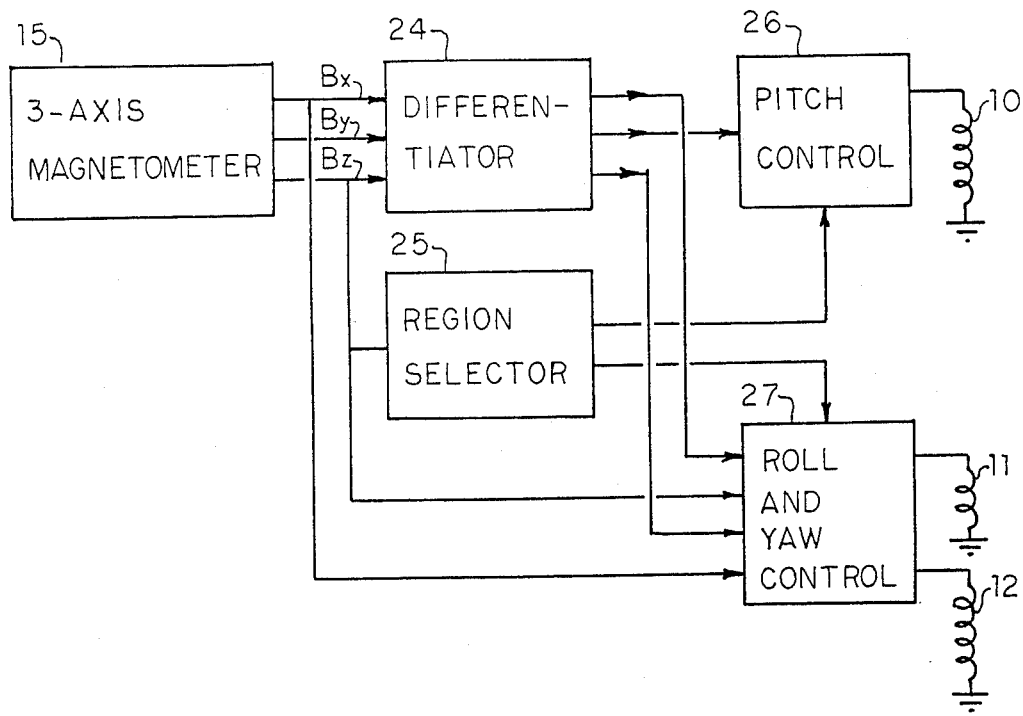
FIG. 2 is an electrical block diagram of an embodiment of the present invention.

The details of control assembly 20 are shown in FIG. 2. Magnetometer 15 produces three outputs Bx, By, and Bz which indicate the strength of the Earth's magnetic field in each of the three axes. Such magnetometers are commercially available. Each of the outputs Bx, By, and Bz are differentiated by circuit 24 to produce three signals that indicate the rate of change with respect to time of the signals Bx, By, and Bz.

The magnitude of the signals obtained by differentiating Bx and Bz depend on the position of the spacecraft relative to the equator and relative to the Earth's magnetic poles. In the particular embodiment shown herein pitch control is obtained by activating the pitch torqrods for thirty degrees on either side of the equator and the poles. This is controlled by region selector 25.

With respect to the roll and yaw torqrods, torque switching region selector 25 operates as follows: Whenever the magnitude of the "yaw" magnetic field is less than 0.15 gauss, the yaw Torqrod is switched on, otherwise the roll Torque rod is used. It is noted that this is a judgmental value. Other values besides to one given here are possible (see the later discussion on various possible models).

The input signals to the TORQRODS 10, 11, and 12 are designated Mx, My, and Mz. The pitch control circuit 26 controls the pitch TORQROD 10. The circuit 27 controls the roll and yaw TORQRODS 11 and 12.

In the acquisition phase, the TORQRODS are controlled as follows:

$Mx = -rg \dot{B}x$
$My = -pg \dot{B}Y$
$Mz = -yg \dot{B}z$

Where:
rg is the gain for the "roll" TORQROD 11
pg is the gain for the "pitch" TORQROD 10
yg is the gain for the "yaw" TORQROD 12

In the libration phase the control equations are as follows:

$My = -pg \dot{B}y$
$Mx = -rg (\dot{B}x + 0.5 Wo \dot{B}z)$
$Mz = -yg (\dot{B}z - 2 Wo \dot{B}x)$ Where:
Wo is the orbital rate of the spacecraft rg, pg, yg are gains as previously indicated.

It is significant to note that with respect to the pitch signal My, the relationship is the same in both the acquisition mode and in the libration mode.

The roll and yaw control circuit 27 provides different signals in the acquisition and in the libration mode. The signals provided in the acquisition mode are similar to those provided in the prior art. These control signals result in a terminal motion of the spacecraft such that the spacecraft will be rotating twice per orbit along the negative Z axes, that is along the orbit normal.

Once the acquisition condition has been achieved a gravity gradient boom is extended and the TORQRODS are activated in the Libration mode, that is, they are activated according to the equations given above which have a term which takes into account the orbital rate of the spacecraft. The particular constants in the equations relate to the particular parameters in the particular spacecraft under consideration. The important factor to be noted is that in the libration mode, the control equations have a term related to the orbital rate of the spacecraft. The control systems in the prior art did not have this type of control.

Figure 3A:
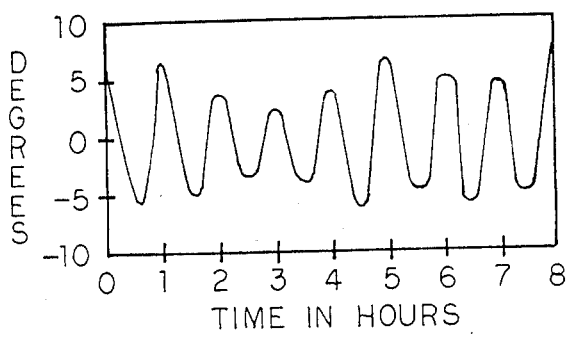
FIGS. 3A, 3B, 3C, 3D, 3E, and 3F show the operation of the system.
Figure 3D:
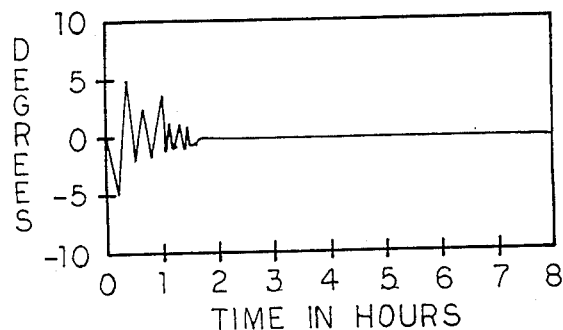
Figure 3B:
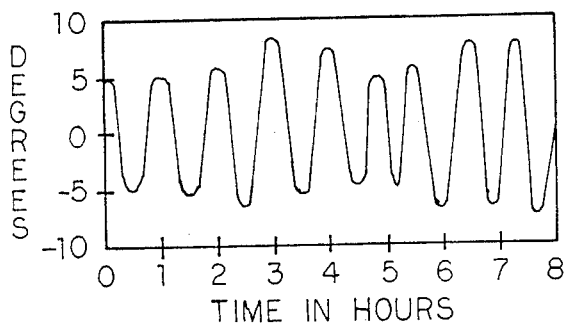
Figure 3E:
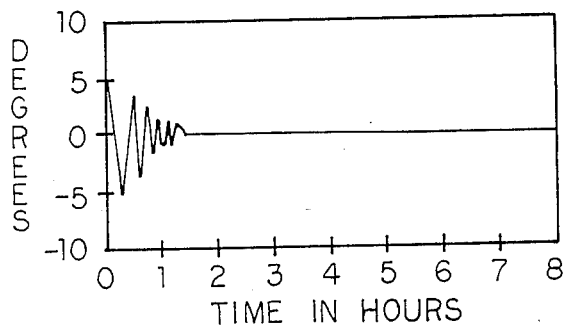
Figure 3C:
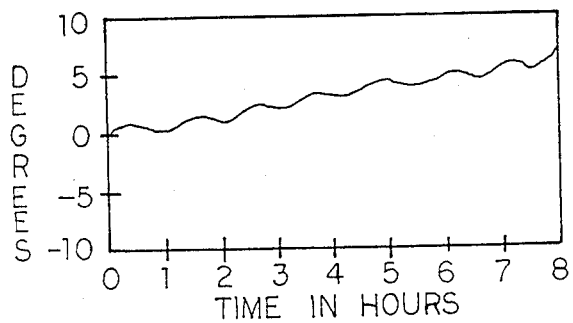

The operation of the invention is best understood with reference to FIGS. 3A to 3D. FIGS. 3A, 3B, and 3C show the natural motion of the spacecraft in the absence of any libration damping. FIGS. 3A, 3B, and 3C are based upon the motion when the initial attitude error of five degrees is present in all axes and the spacecraft is only under the influence of gravity gradient torques. As shown by FIGS. 3A and 3B, the roll and pitch angles exhibit bounded oscillations. As shown by FIG. 3C, the yaw error builds up to one hundred and fifty degrees in eight hours. It is because of the type of librational motion shown in FIGS. 3A, 3B, and 3C, that the prior art spacecraft employed mechanical dampers (i.e. spring dampers, eddy current dampers, hysteresis dampers, etc. ) to stop the libration motion. Use of the present invention dampens all of the libration motion shown in FIGS. 3A, 3B and 3C and locks the spacecraft onto the Earth pointing orientation. Thus the present invention achieves three axis control merely by appropriate control of the three orthogonally positioned Torqrods.

Figure 3F:
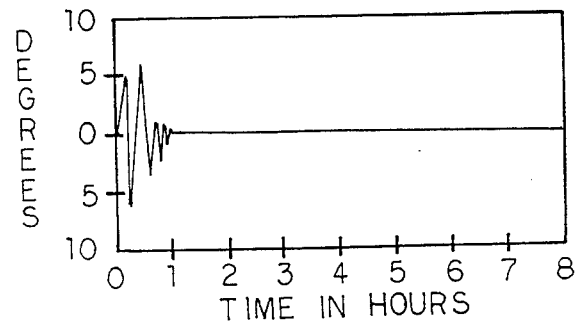

FIGS. 3D, 3E, and 3F show the effect achieved by the present invention operating with gains pg, rg and yg set as follows:

roll gain rg set at $1 \times 10^{10}$ A m$^2$ sec / tesla
pitch gain pg set at $5 \times 10^9$ A m$^2$ sec / tesla
yaw gain yg set at $1 \times 10^{10}$ A m$^2$ sec / tesla It is noted that as shown by FIGS. 3D, 3E, and 3F the attitude errors are driven to zero in a relatively short time period.

While FIGS. 3A to 3F show that the invention performs satisfactorily for a polar orbit with an inclination of 115 degrees, it is noted that the invention would work with a non polar orbit.

It is noted that while the invention as applied in the specific embodiment described herein controls the spin in the yaw axis so that the spin is "zero", if desired by a particular application, the invention could be applied to control the spin to some predetermined value.

It is also noted that the orbital angular velocity signal (that is, signal 22) required by the control laws or algorithms described herein can be generated or obtained in a variety of ways. For example it can be sent to the spacecraft from a ground station that derives the signal from Radar data. Alternately this signal can be generated by examining the output of the magnetometer and noting changes in the Earth's magnetic field such as changes between the strength and direction of the field when the spacecraft is near the Earth's equator or the poles. Likewise signal 21 indicating the mode of flight can be generated in a variety of ways or sent from a ground station.

It is noted that the present invention can be described using a variety of different models. For example one can use a simplified model of the Earth's magnetic field, linearized equations of motion, and small attitude angles. Alternately, one can describe the invention using large attitude angles, and a complex (e.g. seventh order) model of the Earth's magnetic field. The two appendices give two simulation programs for the invention. The first program uses a simplified model and the second uses a complex model. However, irrespective of the simplicity or complexity of the model the principle remains the same.

While the invention has been particularly shown and described with reference to preferred embodiments thereof, it will be understood by those skilled in the art that changes in the form and detail may be made therein without departing from the spirit and scope of the invention.

Having described our invention, what we claim as new and what we desire to secure by Letters Patent is:

1. A control system for controlling a spacecraft in both an acquisition phase and in a libration phase of flight comprising:
   a plurality of electromagnets,
   means for generating rate signals indicating the rate of change of the Earth's magnetic field in a plurality of directions,
   means responsive to said rate signals for activating said electromagnets during said acquisition phase,
   means for generating an orbital signal indicating the orbital angular velocity of said spacecraft,
   means responsive to both said rate signals and to said orbital angular velocity signal for controlling said spacecraft during said libration phase,
   whereby the attitude of said space craft is controlled in both the acquisition phase of flight and in the libration phase of flight using the same electromagnets.

2. A control system for controlling the librational motion of a spacecraft comprising:
   three orthogonally positioned electromagnets, means for generating signals indicating the rate of change of the Earth's magnetic field in each of three orthogonal directions, means for generating an orbital signal indicating the orbital angular velocity of said spacecraft, control means responsive to both said rate signal and to said orbital angular velocity signal for controlling the operation of said electromagnets, whereby the librational motion of said spacecraft is controlled in three axes.

3. The system recited in claim 2 wherein said control means operates according to the following control laws:

$My = -pg \, \dot{B}y$
$Mx = -rg \, (\dot{B}x + 0.5 \, Wo \, \dot{B}z)$
$Mz = -yg \, (\dot{B}z - 2 \, Wo \, \dot{B}x)$ Where:
$\dot{B}z, \dot{B}x,$ and $\dot{B}z$ are the differentiated signals
My, Mx and Mx are the activating signals,
Wo is the orbital rate of the spacecraft 4. The system recited in claim 2 wherein said electromagnets are also used in the acquisition phase of flight to stabilize said spacecraft.

5. The system recited in claim 1 wherein said electromagnets are only operated in selected portions of the spacecraft orbit during the libration phase of flight.

6. The system recited in claim 1 wherein said electromagnets are only operated in selected portions of the spacecraft orbit during the libration phase of flight.

7. The system recited in claim 1 wherein said electromagnets control the yaw, pitch and roll of said spacecraft.

8. The system recited in claim 7 wherein electromagnet that controls pitch is activated by the same control law during both the acquisition and the libration phase of flight.

9. The system recited in claim 2 wherein said electromagnets control the yaw, pitch and roll of said spacecraft and, wherein electromagnet that controls pitch is activated by the same control law during both the acquisition and the libration phase of flight.

* * * * *

UNITED STATES PATENT AND TRADEMARK OFFICE
CERTIFICATE OF CORRECTION

PATENT NO. : 4,807,835

DATED : Feb. 28, 1989

INVENTOR(S) : Robert Z. Fowler

It is certified that error appears in the above-identified patent and that said Letters Patent is hereby corrected as shown below:

```
In col. 6 of the patent after line 27 insert:
      --Two appendices (A and B) are attached which give programs
      that simulate the operation of the present invention.
      These simulations demonstrate how the invention operates
      and they provide additional detail relative to a specific
      embodiment of the invention.--
```

Signed and Sealed this

Twenty-fifth Day of July, 1989

*Attest:*

DONALD J. QUIGG

*Attesting Officer*  *Commissioner of Patents and Trademarks*